(12) United States Patent
Von Heimendahl et al.

(10) Patent No.: US 11,465,773 B2
(45) Date of Patent: Oct. 11, 2022

(54) AIRCRAFT BEACON LIGHT UNIT AND SET OF AIRCRAFT BEACON LIGHT UNITS

(71) Applicant: Goodrich Lighting Systems GMBH, Lippstadt (DE)

(72) Inventors: Andre Hessling Von Heimendahl, Koblenz (DE); Franz-Josef Beermann, Warstein-Belecke (DE); Christian Schoen, Mainz (DE); Sascha Lueder, Rietberg (DE); Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 949 days.

(21) Appl. No.: 14/825,917

(22) Filed: Aug. 13, 2015

(65) Prior Publication Data

US 2016/0046390 A1    Feb. 18, 2016

(30) Foreign Application Priority Data

Aug. 14, 2014  (EP) ..................................... 14180958

(51) Int. Cl.
*B64D 47/06* (2006.01)

(52) U.S. Cl.
CPC .......... *B64D 47/06* (2013.01); *B64D 2203/00* (2013.01)

(58) Field of Classification Search
CPC ..... B64D 2203/00; B64D 47/02; B64D 47/06
USPC ................................................ 362/470–472
See application file for complete search history.

(56) References Cited

U.S. PATENT DOCUMENTS

| 7,645,053 B2 | 1/2010 | Machi et al. | |
|---|---|---|---|
| 2011/0122635 A1* | 5/2011 | Calvin | B64D 47/06 362/470 |
| 2014/0185280 A1* | 7/2014 | Peck | F21V 5/00 362/231 |

FOREIGN PATENT DOCUMENTS

| EP | 2072400 A2 | 6/2009 |
|---|---|---|
| EP | 2157017 A2 | 2/2010 |

OTHER PUBLICATIONS

Charles A Douglas: "Computation of Effective Intensity of Flashing Lights", National Technical Conference of the Illuminating Engineering Society, Atlanta, Georgia, US, Dec. 31, 1957, pp. 641-646, XP055165018, Washington, DC, US, 6 pages.
Code of Federal Regulations (US)—Title 14—Aeronautics and Space; Chapter I—Federal Aviation Administration, Department of Transportation; Subchapter C—Aircraft; Part 25—Airworthiness Standards: Transport Category Airplanes; Subpart F—Equipment; Subjgrp—Lights; Section 25.1401—Anticol, 2 pages.
(Continued)

*Primary Examiner* — William J Carter
(74) *Attorney, Agent, or Firm* — Cantor Colburn LLP

(57) ABSTRACT

An aircraft beacon light unit has an operating light emission distribution. The operating light emission distribution has a first light emission opening angle of at least 150° in a first cross-sectional plane, and a second light emission opening angle of at most 180° in a second cross-sectional plane orthogonal to the first cross-sectional plane. The aircraft beacon light unit is configured in such a way that it is mountable to an aircraft with the first cross-sectional plane being oriented in a vertical direction and the second cross-sectional plane being oriented in a horizontal direction, and the first light emission opening angle extends at least 75° both above and below the second cross-sectional plane.

11 Claims, 6 Drawing Sheets

(56) References Cited

OTHER PUBLICATIONS

Jan. 1, 2012, pp. 25-27, XP055165013, retrieved from internet: URL:http://www.gpo.gov/fdsys/pkg/CFR-2012-title14-vol1/pdf/CFR-2012title4-vol1-sec25-1401.pdf [retrieved on Jan. 27, 2015].
Notification of Transmittal of the European Search Report; EP Application No. 14180958.2-1754, dated Feb. 4, 2015, 10 pages.
European Search Report for Application No. 19153111.0, dated May 6, 2019, 12 pages.
Washington Nn: "Advisory Circular AC 20-30B: Aircraft Position Light and Anticollision Light Installations", Jul. 20, 1981 (Jul. 20, 1981) XP055436930, Washington D.C. Retrieved from the Internet: URL:http://www.faa.gov/documentLibrary/media/Advisory_Circular/AC_20-30B.pdf [retrieved on Dec. 20, 2017].
AIM, Air Traffic Control/Airport Operations Section 3 Airport Operations, May 2022 (May 2022) [retrieved on May 16, 2022 (May 16, 2022)]. Retrieved from the internet:,URL:https://www.faa.gov/air_traffic/publications/atpubs/aim_html/chap4_section_3.html.
Code of Federal Regulations, Title 14/Chapter 1/Subchapter F/Part 91/Subpart C/ 91.209 Aircraft lights, Updated May 12, 2022, last amended Apr. 19, 2022 [retrieved on May 16, 2022 (May 16, 2022)]. Retrieved from the internet:,URL: https://www.ecfr.gov/current/title-14/chapter-I/subchapter-F/part-91/subpart-C/section-91.209.
Summons to Attend Oral Proceedings Pursuant to Rule 115(1) EPC for Application No. 19153111.0, mailed Jul. 14, 2021, 12 pages.

\* cited by examiner

AIRCRAFT BEACON LIGHT UNIT AND SET OF AIRCRAFT BEACON LIGHT UNITS

TECHNICAL FIELD

The present invention relates to exterior aircraft lighting. In particular, it relates to aircraft beacon lights.

BACKGROUND

Aircraft beacon lights are in general provided for alerting the ground personnel that the aircraft engines are running and have to be turned on whenever the engines are on. They are also a safety warning to other persons on the airfield, indicating that the aircraft is operational and might move. For example, other pilots or drivers of all kinds of airport vehicles can determine if an aircraft is ready to move and if its movement may cause collisions on the airfield. For this reason, beacon lights are sometimes also referred to as anti-collision beacon lights. They emit light in a red color and are entirely separated from the white anti-collision lighting of the aircraft, whose light units are commonly referred to merely as anti-collision lights.

A prior art arrangement of beacon lights on an aircraft is shown in FIG. 1. FIG. 1 shows an exemplary aircraft 2. The aircraft 2 is equipped with two beacon lights, one of which is disposed on the top of the aircraft fuselage and one of which is placed on the bottom of the aircraft fuselage. The top beacon light is placed at a position along the length of the aircraft fuselage where the wings have their roots. The light emission from the top beacon light is illustrated by a first circle 4, which illustrates that the top beacon light emits lights in a 360° angle. The bottom beacon light is placed on the bottom of the aircraft fuselage at its tail. The light emission by the bottom beacon light is illustrated by a second circle 6, which illustrates that the bottom beacon light emits light in a 360° angle.

These beacon lights generally emit light of a reddish orange colour. Commonly, the beacon lights do not emit light in all directions of the 360° opening angle at the same time. Instead, they rotate and thus produce a flashing effect.

FIG. 2 shows an illustration of the light intensity values required by Federal Aviation Regulation (FAR) § 25.1401. From FIG. 2, it can be seen that the light emission distribution for beacon lights is the same for the top beacon light and the bottom beacon light, just flipped upside down. As was indicated by the first circle 4 and the second circle 6 in FIG. 1, the light emission distributions of the top beacon light and the bottom beacon light are rotationally symmetric.

The FAR also contains requirements with respect to maximum acceptable shadowing of this light emission distribution by aircraft structures, such as antennas, engines, wing-tips, etc. For this reason, prior art beacon lights tend to be fairly large in the height dimension and create a very significant aerodynamic drag.

Accordingly, it would be beneficial to provide an aircraft beacon light unit that reduces or eliminates above described disadvantages of the prior art.

SUMMARY

Exemplary embodiments of the invention include an aircraft beacon light unit with an operating light emission distribution, wherein the operating light emission distribution has a first light emission opening angle of at least 150° in a first cross-sectional plane, and a second light emission opening angle of at most 180° in a second cross-sectional plane orthogonal to the first cross-sectional plane, wherein the aircraft beacon light unit is configured in such a way that it is mountable to an aircraft with the first cross-sectional plane being oriented in a vertical direction and the second cross-sectional plane being oriented in a horizontal direction, and wherein the first light emission opening angle extends at least 75° both above and below the second cross-sectional plane.

On the one hand, such a design of the aircraft beacon light unit allows for covering the entire vertical light emission distribution, as required by the FAR and as split up between two beacon lights in prior art approaches. On the other hand, the exemplary embodiment of the invention has an opening angle of at most 180° in the horizontal cross-sectional plane, as compared to the 360° opening angle of prior art beacon lights. By eliminating the 360° opening angle of the beacon light in the horizontal cross-sectional plane, the beacon light unit can be made a lot more compact and designed in such a way that it can be included in areas of the plane where space is a scarce resource, such as the wing-tips or the tail of the aircraft. In these locations, no aircraft structures shadow the light emitted from the exemplary aircraft beacon light unit, which again leads to a more compact and space-efficient design.

Stated in very simplified terms, the invention is directed towards providing an aircraft beacon light unit, which aircraft beacon light unit forms the basis for replacing the prior art beacon light system, which has one beacon light for the Northern hemisphere and another beacon light for the Southern hemisphere with respect to the aircraft, with a novel aircraft beacon light system, which consists of aircraft beacon light units of the described type, which cover both the Northern and Southern hemisphere, but have a limited horizontal opening angle. In other words, instead of splitting up the 4π solid angle of the light emission distribution of the beacon light system into a Northern hemisphere and a Southern hemisphere between two beacon light units, the aircraft beacon light unit according to the exemplary embodiment of the invention allows for a splitting up of the 4π solid angle of the light intensity distribution into sectors, with each sector extending both towards the Northern hemisphere and the Southern hemisphere. The aircraft beacon light unit according to the exemplary embodiment is an elementary module that makes such replacement of the whole beacon light system possible.

As discussed above, the aircraft beacon light unit according to the exemplary embodiment of the invention is very compact and can be integrated into the wing-tips and the tail of the aircraft. In this way, large beacon lights on top of the fuselage and on the bottom of the fuselage, which lead to large aerodynamic drag, can be eliminated. Moreover, this additional area of prior art beacon lights, which was prone to bird or stone strikes, can be eliminated, thus increasing the overall safety of the aircraft and reducing maintenance efforts. Also, by making it possible to place the aircraft beacon light units at positions remote from the center of the aircraft, shadowing of the beacon light emission by aircraft structures can be reduced or even entirely eliminated.

According to a further embodiment, the operating light emission distribution is symmetric with respect to the second cross-sectional plane. In other words, the aircraft beacon light unit is designed in such a way that the light emission distribution in the Northern hemisphere corresponds to the light emission distribution in the Southern hemisphere for the sector defined by the first light emission opening angle. Accordingly, an equal warning illumination towards the top and towards the bottom is ensured by the aircraft beacon light unit in accordance with this exemplary embodiment.

According to a further embodiment, the operating light emission distribution in the first cross-sectional plane satisfies a set of minimum requirements of a predefined vertical light emission distribution of an aircraft beacon light unit. In this way, the aircraft beacon light unit is adapted to be used for aircraft where a particular set of minimum requirements for the beacon light intensity distribution exists.

According to a particular embodiment, the set of minimum requirements is defined by Federal Aviation Regulation § 25.1401. In this way, the aircraft beacon light unit provides for a vertical light emission distribution that is in compliance with said section of the FAR.

According to a further embodiment, the maximum light intensity of the operating light emission distribution is at least 400 cd. In particular, the maximum light intensity of the operating light emission distribution may be at most 1000 cd.

According to a further embodiment, the light intensity values of the operating light emission distribution are at least equal to the following values in the first cross-sectional plane: 400 cd for a first angular range of between 0° and ±5° with respect to the second cross-sectional plane; 240 cd for a second angular range of between ±5° and ±10° with respect to the second cross-sectional plane; 80 cd for a third angular range of between ±10° and ±20° with respect to the second cross-sectional plane; 40 cd for a fourth angular range of between ±20° and ±30° with respect to the second cross-sectional plane; and 20 cd for a fifth angular range of between ±30° and ±75° with respect to the second cross-sectional plane. The expression of the light intensity values being at least equal to particular values is to be understood in such a way that the light intensity values of the operating light emission distribution are greater or equal to the given number values. The expression of "±x° and ±y° with respect to the second cross-sectional plane" is understood to include both sub-ranges of between +x° and +y° with respect to the second cross-sectional plane and between −x° and −y° with respect to the second cross-sectional plane.

According to a further embodiment, the light intensity values of the operating light emission distribution are effective light intensity values, calculated via the Blondel Rey formula. The Blondel Rey formula is a way of providing a measure of the perceived light intensity in the case of light flashes. In this way, it is made possible to set the perceived light intensity to a desired value. The Blondel Rey formula is:

$$I_e = \frac{\int_{t_1}^{t_2} I(t)dt}{0.2 + (t_2 - t_1)},$$

with $I_e$ denoting the effective light intensity and $I(t)$ denoting the course of light intensity over time during the light flash.

According to a further embodiment, the first light emission opening angle is at most 180°. In this way, high efficiency of the overall aircraft beacon light system can be achieved. By keeping the first light emission opening angle at or below 180°, an overlap between light emission from different aircraft beacon light units can be kept small, and the whole illumination capacity of the light sources of the aircraft beacon light unit may be used for the desired range in the vertical direction.

According to a further embodiment, the second light emission opening angle is between 60° and 180°, in particular between 90° and 150°. In this way, the horizontal opening angle of the aircraft beacon light unit can be kept in a range where an unobstructed light emission is made possible from the aircraft, in particular from locations of the aircraft that are remote from its center. Also, by keeping the second light emission opening angle in the given range, a compact design of the aircraft beacon light unit may be ensured.

According to a further embodiment, the aircraft beacon light unit is a wing tip aircraft beacon light unit and the second light emission opening angle is between 90° and 130°, in particular between 100° and 120°, and further in particular around 110°.

According to a further embodiment, the aircraft beacon light unit is a tail aircraft beacon light unit and the second light emission opening angle is between 120° and 180°, in particular between 130° and 150°, and further in particular around 140°.

According to a further embodiment, the operating light emission distribution satisfies a set of minimum requirements of a predefined vertical light emission distribution of an aircraft beacon light unit in all cross-sectional planes that are orthogonal to the second cross-sectional plane and that are within the second light emission opening angle. In this way, compliance with required or desired light emission distributions is ensured across all the whole light emission width of the aircraft beacon light unit.

According to a further embodiment, the aircraft beacon light unit in operation emits light of a red color, in particular having the color of aviation red. Aviation red is a standard shade of red used in the aviation industry and known to the skilled person.

According to a further embodiment, the aircraft beacon light unit may have one or more light sources. These one or more light sources may be electrically de-coupled from the white anti-collision lighting system of the aircraft. In this way, two independent warning light system may be provided at the aircraft.

According to a further embodiment, the one or more light sources may one or more LEDs.

According to a further embodiment, the aircraft beacon light unit may have an optical structure for transforming the light intensity distribution of the one or more light sources into the operating light emission distribution. Such optical structures, for example comprising suitable lenses and/or reflectors, are per se known to the skilled person.

According to a further embodiment, the aircraft beacon light unit is one of a combined aircraft beacon light and navigation light unit, a combined aircraft beacon light and anti-collision light unit, and a combined aircraft beacon light, navigation light and anti-collision light unit. In other words, the beacon light functionality may be integrated into an existing navigation light or into an existing anti-collision light or into an existing combined navigation and anti-collision light. In this way, existing light unit locations at the wing-tips or at the tail of the aircraft may be used for newly combined lighting structure. This entirely eliminates the need for a dedicated beacon light housing/structure. This in turn leads to an overall increase of the lighting system space-efficiency for the entire aircraft.

Exemplary embodiments of the invention further include a set of aircraft beacon light units, wherein each of the set of aircraft beacon light units is in accordance with one of the embodiments described above and wherein the second light emission angles of the set of aircraft beacon light units add up to at least 360°, such that a 360° illumination in the horizontal plane of an aircraft is possible via the set of aircraft beacon light units. In this way, the set of aircraft beacon light units allow for a set-up that satisfies desired or required light intensity values for aircraft beacon lights in both a horizontal and a vertical direction.

Above described modifications and advantages apply to each of the set of aircraft beacon light units in an analogous manner. Accordingly, each of the set of aircraft beacon light units may be modified in any of the manners discussed above. The aircraft beacon light units of the set may comprise the same modifications or may be based on different embodiments.

According to a further embodiment, the plurality of aircraft beacon light units comprises a right wing-tip aircraft beacon light and a left wing-tip aircraft beacon light, with the second light emission angle of each of the right wing-tip aircraft beacon light unit and the left wing-tip aircraft beacon light unit being between 90° and 140°. In this way, highly unobstructed emission of light in accordance with required or desired beacon light functionality can be provided from the two wing-tips of the aircraft. Also, the restricted angular range of the second light emission angle of between 90° and 140° allows for a very compact design of the two wing-tip aircraft beacon light units that allow for an installation in the highly restricted space of the wing-tips.

According to a further embodiment, the set of aircraft beacon light units comprises either exactly one tail aircraft beacon light unit, with the second light emission angle of the tail aircraft beacon light unit being between 100° and 180°, or exactly two tail aircraft beacon light units, with the second light emission angle of each of the exactly two tail aircraft beacon light units being between 50° and 90°. In this way, a desired/required beacon light functionality towards the rear of the aircraft may be achieved via one or two aircraft beacon light units, depending on the construction of the aircraft in question.

Exemplary embodiments of the invention also include an aircraft, such as an airplane, in particular a passenger or cargo airplane, that has at least one aircraft beacon light unit, as described in any of the exemplary embodiments above. In a particular embodiment, the aircraft may have a set of aircraft beacon light units, as described in any of the embodiments above. The modifications and advantages discussed above with respect to the aircraft beacon light unit and with respect to the set of aircraft beacon light units apply to the aircraft in an analogous manner.

BRIEF DESCRIPTION OF DRAWINGS

Further exemplary embodiments of the invention are described below with respect to the accompanying drawings, wherein.

DETAILED DESCRIPTION

Figure 1:
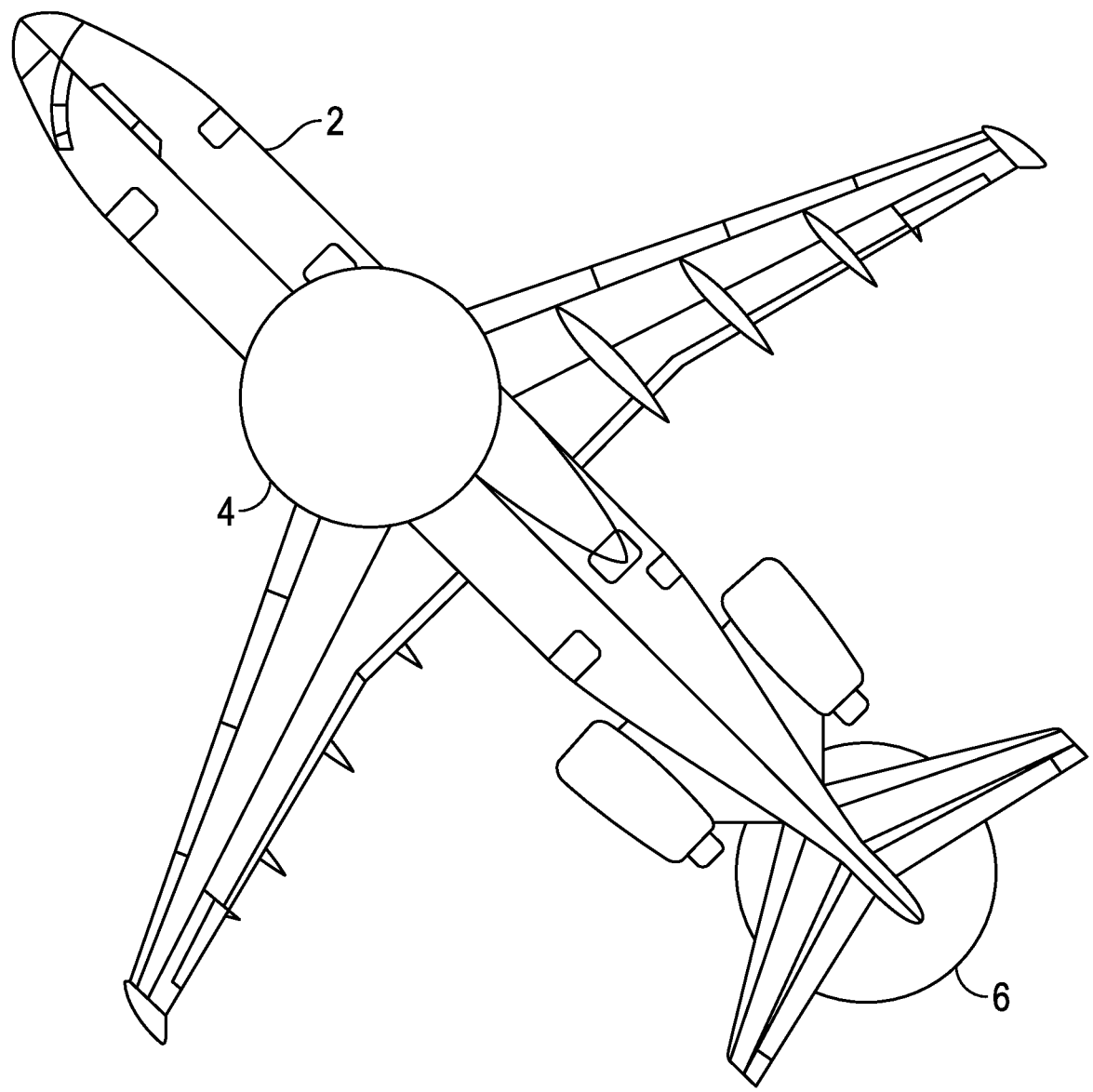
FIG. 1 shows a prior art arrangement of aircraft beacon light units on an aircraft in a top view.
Figure 2:
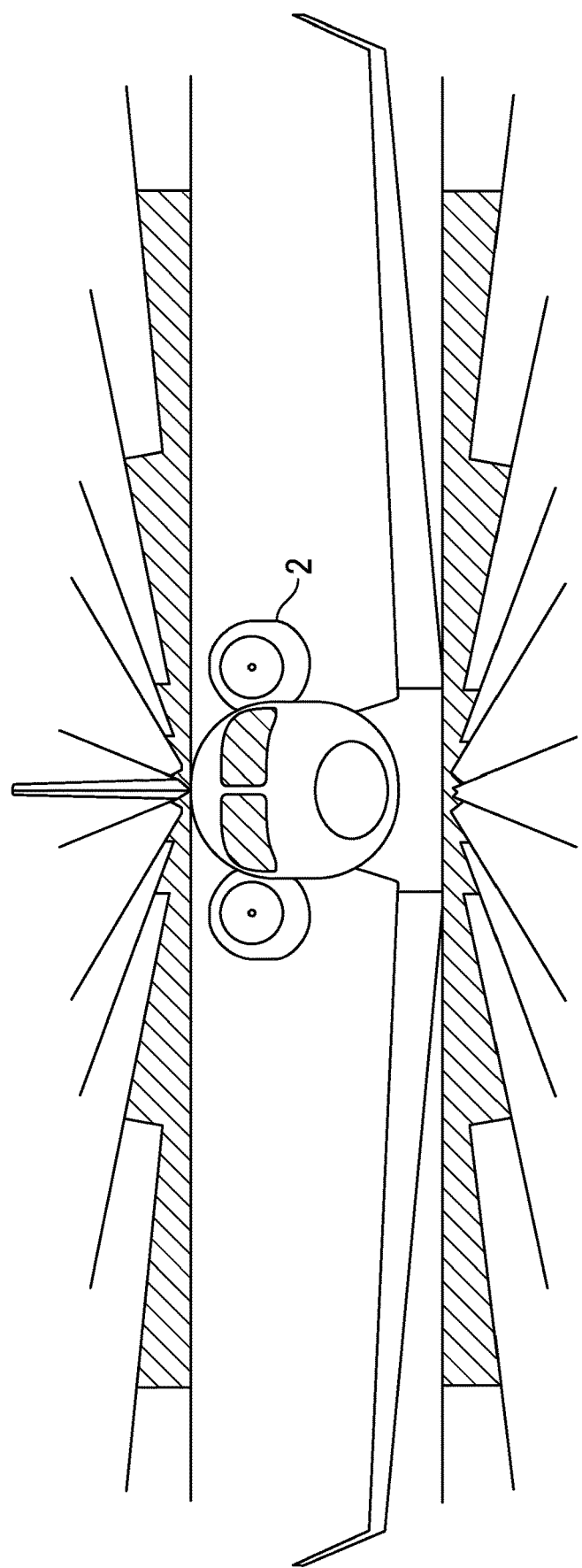
FIG. 2 shows the prior art arrangement of aircraft beacon light units of FIG. 1 in a front view of the aircraft.
Figure 3:
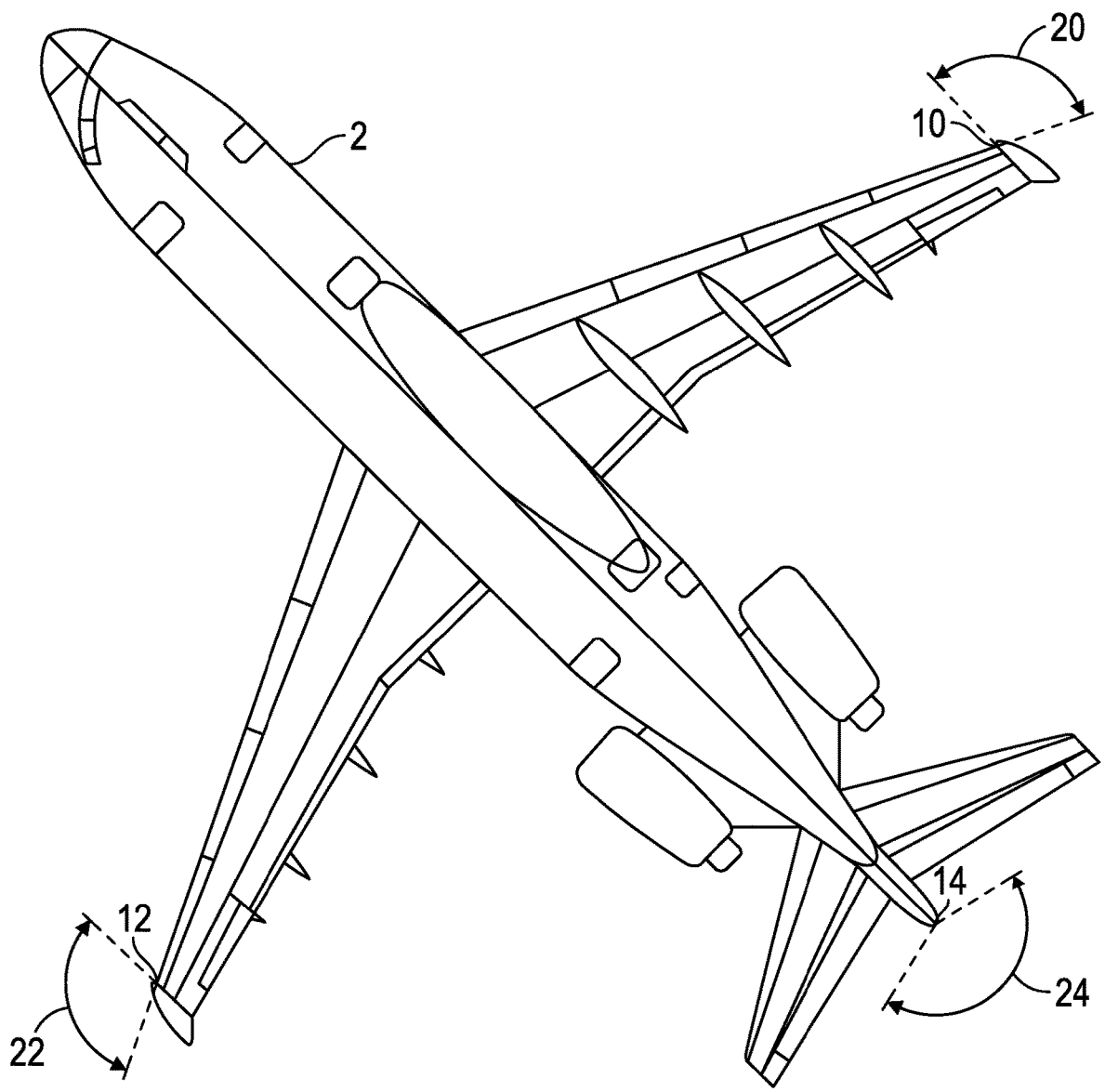
FIG. 3 shows an aircraft with a set of aircraft beacon light units in accordance with exemplary embodiments of the invention in a top view.

FIG. 3 shows an aircraft 2 equipped with three aircraft beacon light units 10, 12 and 14 in accordance with exemplary embodiments of the invention. In particular, the aircraft 2 is equipped with a right wing tip aircraft beacon light unit 10, with a left wing tip aircraft beacon light unit 12, and with a tail aircraft beacon light unit 14.

The right wing tip aircraft beacon light unit 10 is positioned in the front of the right wing tip in flight direction. The left wing tip aircraft beacon light unit is positioned in the front of the left wing tip in flight direction. The tail aircraft beacon light unit 14 is positioned at the very aft portion of the aircraft 2 and is centered with respect to the left-right extension of the aircraft 2.

FIG. 3 shows the horizontal light emission distributions of the three aircraft beacon light units 10, 12, and 14 in a schematic view. In particular, FIG. 3 shows the light intensity distributions of the three aircraft beacon light units in a horizontal cross-section through the three aircraft beacon light units, which is also referred to as the second cross-sectional plane in the present document.

FIG. 3 illustrates the horizontal opening angles of the three aircraft beacon light units 10, 12, and 14, which opening angles are also referred to as second light emission opening angles in the present document. The right wing tip aircraft beacon light unit 10 has a right wing tip horizontal opening angle 20. The left wing tip aircraft beacon light unit 12 has a left wing tip horizontal opening angle 22. The tail aircraft beacon light unit 14 has a tail horizontal opening angle 24.

In the exemplary embodiment of FIG. 3, the right wing tip horizontal opening angle 20 is about 125°, the left wing tip horizontal opening angle 22 is also about 125°, and the tail horizontal opening angle 24 is about 110°. The sum of these three horizontal opening angles 20, 22, and 24 is 360°. With a combined opening angle of 360° and no overlap between the horizontal opening angles due to the particular arrangement of the three aircraft beacon light units 10, 12, and 14, a 360° illumination in the horizontal plane with respect to the aircraft is made possible.

In the exemplary embodiment of FIG. 3, the right wing tip horizontal opening angle 20 extends from 0° to −125° with respect to the flight direction, and the left wing tip horizontal opening angle 22 extends from 0° to −125° with respect to the flight direction. The tail horizontal opening angle 24 covers the remainder of the 360° with respect to the flight direction.

Figure 4:
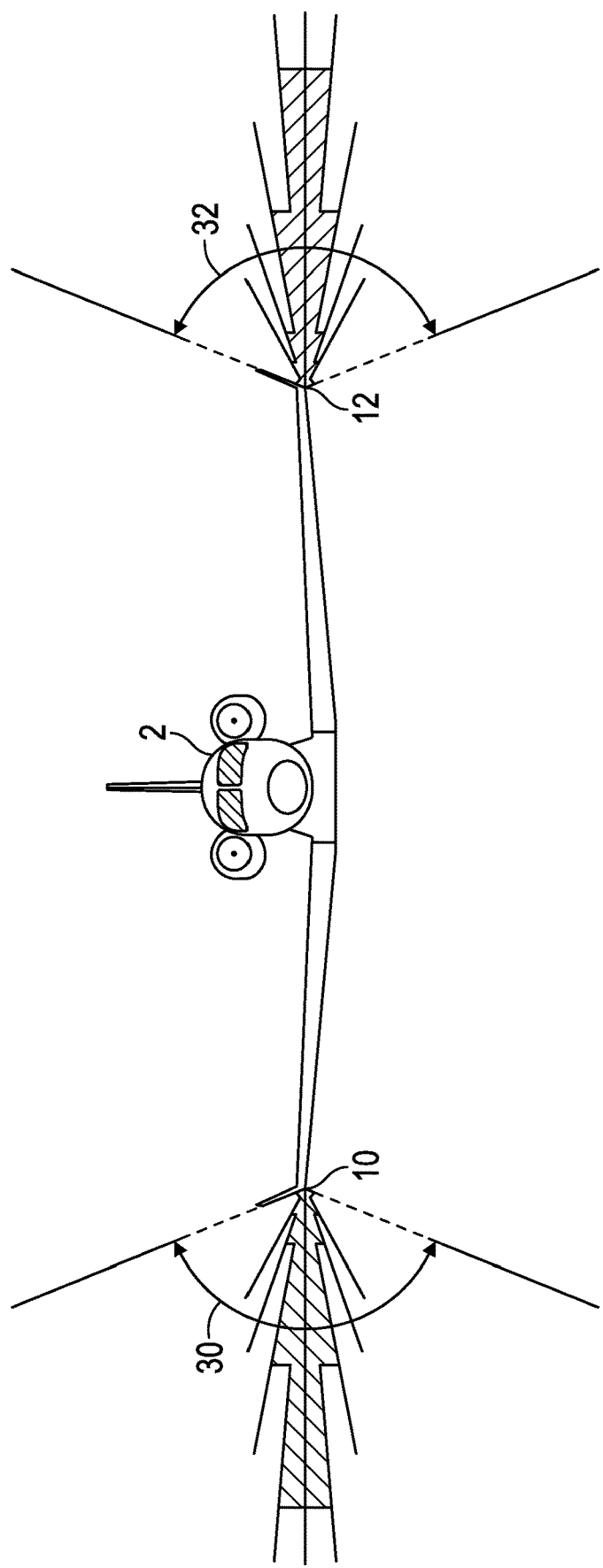
FIG. 4 shows the set of aircraft beacon light units of FIG. 3 in a front view of the aircraft.

FIG. 4 shows the aircraft 2 of FIG. 3 in a front view. In the front view, the right wing tip aircraft beacon light unit 10 and the left wing tip aircraft beacon light unit 12 are visible. For both of these aircraft beacon light units 10 and 12, the respective vertical light emission distributions are shown in FIG. 4. In particular, the vertical light emission distributions in the left-right cross-sectional plane through the two aircraft beacon light units 10 and 12 of the aircraft are shown. This vertical left-right cross-sectional plane is an exemplary first cross-sectional plane, as referred to at various points throughout this document. Other examples of first cross-sectional planes are other vertical cross-sectional planes that go through the aircraft beacon light unit in question.

In the exemplary embodiment of FIG. 4, the right wing tip aircraft beacon light unit 10 has a right wing tip vertical opening angle 30, and the left wing tip aircraft beacon light unit 12 has a left wing tip vertical opening angle 32. These vertical opening angles are also referred to as first light emission opening angles of the aircraft beacon light units throughout this document.

In the exemplary embodiment of FIG. 4, the right wing tip vertical opening angle 30 is 150° and extends from +75° to −75° with respect to the horizontal direction. Analogously, the left wing tip vertical opening angle 32 is 150° and extends from +75° to −75° with respect to the horizontal direction.

Both of the right wing tip aircraft beacon light unit 10 and the left wing-tip aircraft beacon light unit 12 have a light intensity distribution in the exemplary cross-sectional plane as follows: The light intensity is 400 cd for a first angular range from −5° to +5° with respect to the horizontal direction. The light intensity is 240 cd in a second angular range, consisting of the sub-ranges from −10° to −5° and from +5° to +10°, with respect to the horizontal direction. The light intensity is 80 cd in a third angular range, consisting of two sub-ranges extending from −20° to −10° and +10° to +20° with respect to the horizontal direction. The light intensity is 40 cd in a fourth angular range, consisting of the sub-ranges from −30° to −20° and +20° to +30° with respect to the horizontal direction. The light intensity is 20 cd in a fifth angular range, consisting of the sub-ranges between −75° to −30° and +30° to +75° with respect to the horizontal direction. It is pointed out that the vertical light emission distributions of the aircraft beacon light units may also have different shapes. They may in particular have continuous changes of light intensity values over the opening angle.

It is further pointed out that, in the exemplary embodiment of FIGS. 3 and 4, the vertical light emission distribution of FIG. 4 is present for all vertical planes through one of the three aircraft beacon light units 10, 12 and 14. In this way an identical vertical light emission distribution is ensured over the whole 360° opening angle around the aircraft.

A flashing effect of the three aircraft beacon light units 10, 12 and 14 may be achieved via an according control thereof. Further, a revolving effect of the light emission around the aircraft may be achieved via an according synchronization of the three aircraft beacon light units 10, 12 and 14.

Figure 5A:
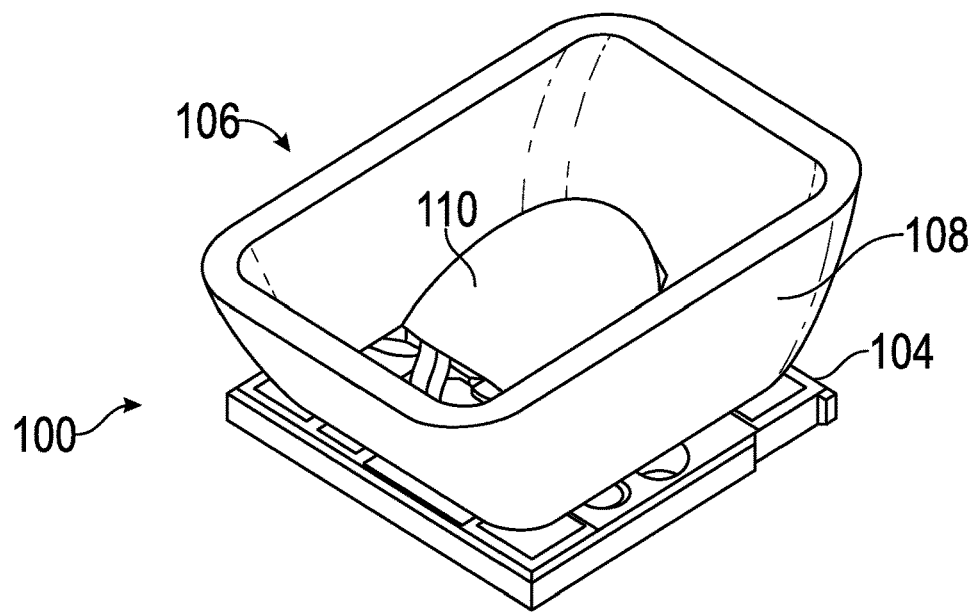
FIG. 5A-FIG. 5C, show an exemplary embodiment of an aircraft beacon light unit in accordance with the invention.
Figure 5B:
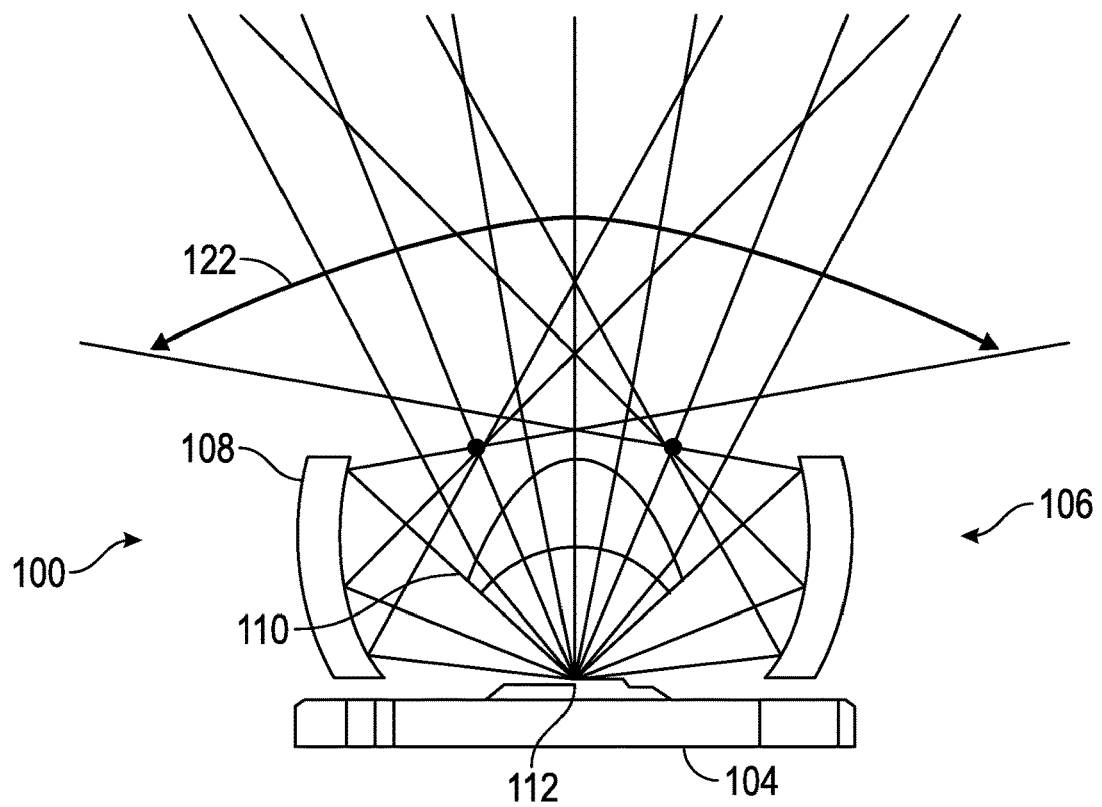
Figure 5C:
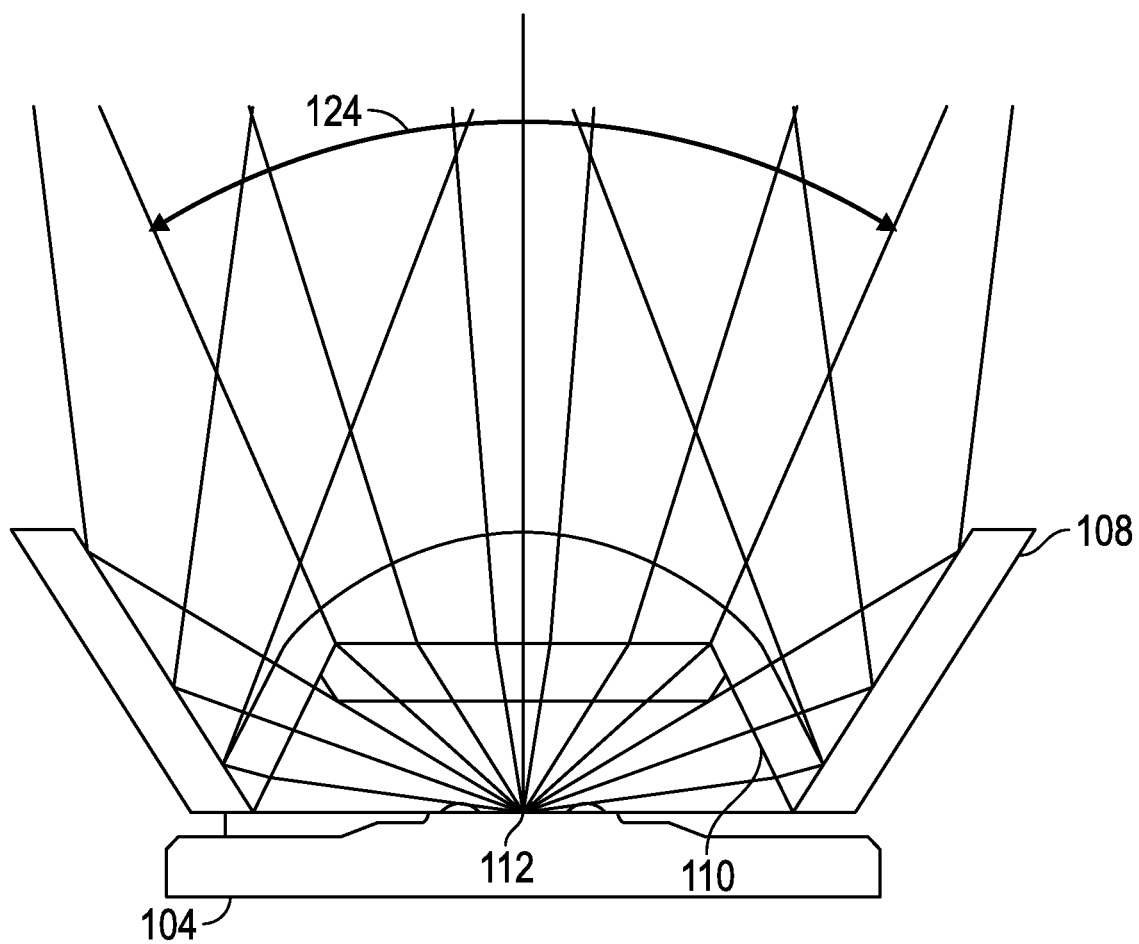

FIGS. 5A to 5C show an aircraft beacon light unit 100 in accordance with an exemplary embodiment of the invention in different views. FIG. 5A shows a perspective view, while FIGS. 5B and 5C respectively show vertical and horizontal cross-sectional views through the aircraft beacon light unit 100. It is pointed out that the design of the aircraft beacon light unit 100 is merely exemplary and that many other designs are also possible.

FIG. 5A shows a perspective view of the exemplary aircraft beacon light unit 100. The aircraft beacon light unit 100 comprises a mounting structure 104 and an optical system 106. It further comprises a light source, such as an LED. This light source is not shown in the perspective view of FIG. 5A, because it is arranged between the mounting structure 104 and the optical system 106. The optical system 106 has a surrounding reflector 108 and a refractive optical element 110, such as a lens. The surrounding reflector 108 and the refractive optical element 110 jointly provide for a transformation of the light emission distribution of the light source into the desired light emission distribution of the aircraft beacon light unit 100.

FIG. 5B shows the aircraft beacon light unit 100 in a first cross-sectional view. When the aircraft beacon light unit 100 is mounted to the aircraft in its position of operation, the cross-sectional plane of FIG. 5B is a vertical cross-sectional plane through the aircraft beacon light unit 100. In FIG. 5B, the light source 112 is visible in its position between the mounting structure 104 and the optical system 106. It can be seen that the optical system 106 provides for a large opening angle 122 of more than 150° in the depicted vertical cross-sectional plane. In this way, the aircraft beacon light unit 100 can cover both the required vertical light emission distributions above as well as below the horizontal plane.

FIG. 5C shows the aircraft beacon light unit 100 in a second cross-sectional view. When the aircraft beacon light unit 100 is mounted to the aircraft in its position of operation, the cross-sectional plane of FIG. 5C is a horizontal cross-sectional plane through the aircraft beacon light unit 100. In the exemplary embodiment of FIG. 5C, the opening angle 124 of the light emission distribution in the depicted horizontal cross-sectional plane is only about 70°. However, this angle can be adjusted by modifying the refractive optical element 110 and/or changing the inclination of or eliminating the surrounding reflector 108. Accordingly, horizontal opening angles of up to 180° can be achieved. It is again pointed out that many other designs of the optical system are possible that may lead to any of above discussed light emission distributions and opening angles.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft comprising:
a set of aircraft beacon light units, wherein each of the set of aircraft beacon light units has an operating light emission distribution that has
 a first light emission opening angle of at least 150° in a first cross-sectional plane, and
 a second light emission opening angle of at most 180° in a second cross-sectional plane orthogonal to the first cross-sectional plane,
wherein each of the set of aircraft beacon light units is mounted to the aircraft with the first cross-sectional plane being oriented in a vertical direction and the second cross-sectional plane being oriented in a horizontal direction,
wherein the first light emission opening angle of each of the set of aircraft beacon light units extends at least 75° both above and below the second cross-sectional plane,
wherein the second light emission opening angles of the set of aircraft beacon light units add up to at least 360°, such that a 360° illumination in the horizontal plane of the aircraft is possible via the set of aircraft beacon light units,
wherein each of the set of aircraft beacon light units is configured to emit flashes of aviation red light, and
wherein the set of aircraft beacon light units comprises:
 a right wing tip aircraft beacon light unit and a left wing tip aircraft beacon light unit, with the second light emission opening angle of each of the right wing tip aircraft beacon light unit and the left wing tip aircraft beacon light unit being between 90° and 140°, and
 at least one tail aircraft beacon light unit, with a total second light emission opening angle of the at least one tail aircraft beacon light unit being between 100° and 180°,
wherein each of the right wing tip aircraft beacon light unit, the left wing tip aircraft beacon light unit, and the at least one tail aircraft beacon light unit is a combined aircraft beacon light and anti-collision light unit, configured to emit flashes of aviation red light and configured to emit flashes of white light.

2. An aircraft according to claim 1, wherein the operating light emission distribution of each of the set of aircraft beacon light units is symmetric with respect to the second cross-sectional plane.

3. An aircraft according to claim 1, wherein, for each of the set of aircraft beacon light units, the operating light emission distribution in the first cross-sectional plane satisfies a set of minimum requirements of a predefined vertical light emission distribution of an aircraft beacon light unit.

4. An aircraft according to claim 3, wherein the set of minimum requirements is defined by Federal Aviation Regulation § 25.1401.

5. An aircraft according to claim 1, wherein the light intensity values of the operating light emission distribution of each of the set of aircraft beacon light units are at least equal to the following values in the first cross-sectional plane:
- 400 cd for a first angular range of between 0° and ±5° with respect to the second cross-sectional plane,
- 240 cd for a second angular range of between ±5° and ±10° with respect to the second cross-sectional plane,
- 80 cd for a third angular range of between ±10° and ±20° with respect to the second cross-sectional plane,
- 40 cd for a fourth angular range of between ±20° and ±30° with respect to the second cross-sectional plane, and
- 20 cd for a fifth angular range of between ±30° and ±75° with respect to the second cross-sectional plane.

6. An aircraft according to claim 1, wherein the light intensity values of the operating light emission distribution of each of the set of aircraft beacon light units are effective light intensity values, calculated via the Blondel Rey formula.

7. An aircraft according to claim 1, wherein the first light emission opening angle is at most 180°.

8. An aircraft according to claim 1, wherein the operating light emission distribution of each of the set of aircraft beacon light units satisfies a set of minimum requirements of a predefined vertical light emission distribution of an aircraft beacon light unit in all cross-sectional planes that are orthogonal to the second cross-sectional plane and that are within the second light emission opening angle.

9. An aircraft according to claim 1, wherein one or more or all of the set of aircraft beacon light units is a combined aircraft beacon light, navigation light and anti-collision light unit.

10. An aircraft according to claim 1, wherein the set of aircraft beacon light units comprises one of:
- exactly one tail aircraft beacon light unit, with the second light emission angle of the tail aircraft beacon light unit being between 100° and 180°, and
- exactly two tail aircraft beacon light units, with the second light emission angle of each of the exactly two tail aircraft beacon light units being between 50° and 90°.

11. An aircraft according to claim 1, wherein the aircraft is an airplane.

* * * * *